Sept. 1, 1925.
J. W. BISHOP
1,552,202
BOWLING ALLEY PIN SPOT
Filed April 15, 1925
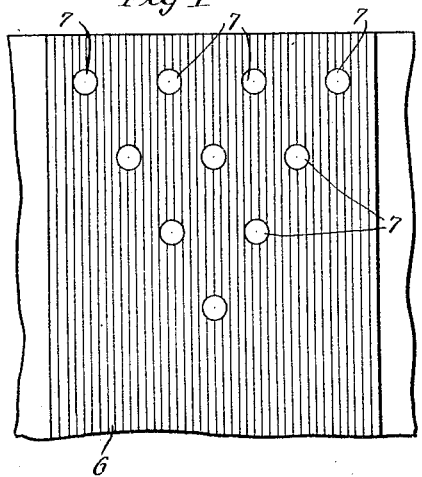
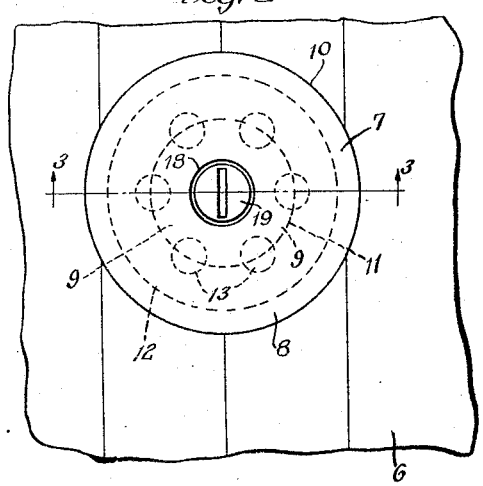
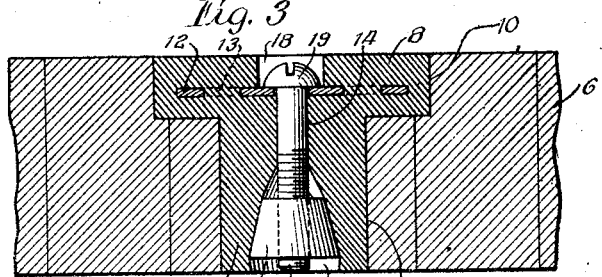
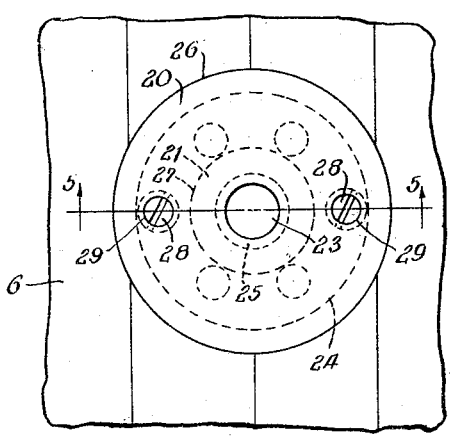
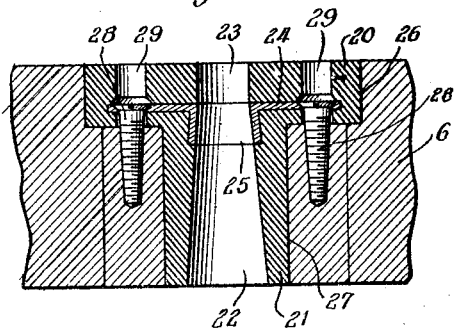
Inventor:
Joseph W. Bishop
By: Wm. O. Bell
atty.

Patented Sept. 1, 1925.

1,552,202

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

BOWLING-ALLEY PIN SPOT.

Application filed April 15, 1925. Serial No. 23,184.

*To all whom it may concern:*

Be it known that I, JOSEPH W. BISHOP, a citizen of the United States, residing at Muskegon, in the county of Muskegon and State of Michigan, have invented certain new and useful Improvements in Bowling-Alley Pin Spots, of which the following is a specification.

This invention relates to bowling alleys and particularly to the pin spots thereon, and its object is to provide a pin spot which will lessen the noise and reduce the wear on the base of the pin, and which can be easily installed and replaced.

In the accompanying drawings illustrating the invention

Fig. 1 is a plan view of the pin spot end of a bowling alley bed;

Fig. 2 is a plan view showing one form of my pin spot in the bed;

Fig. 3 is a sectional view on the line 3—3 of Fig. 2;

Fig. 4 is a plan view of another form of pin spot having an opening through the center to receive a setting pin;

Fig. 5 is a sectional view on the line 5—5 of Fig. 4.

Referring to the drawings, 6 is the alley bed, which is provided with properly disposed pin spots 7 for the game of ten-pins. The pin spots are seated in recesses and are secured therein in a suitable manner so that they will lie flush with the surface of the alley bed.

In Figs. 2 and 3 the spot is in the form of a circular disk head 8 having a cylindrical shank 9, the head being seated in the recess 10 and the shank being seated in the opening 11 in the alley bed. A holding plate 12 is embedded in the head, and it is provided with openings 13 to receive the material of which the spot is made to anchor the plate in the head. The shank has an opening 14 to receive a bolt 15, this opening being enlarged at 16 near and at the bottom of the shank and having tapering walls to receive a wedge-shaped nut 17 threadedly engaging the bolt. The head of the spot is recessed at 18 to receive the head 19 of the bolt, which is seated in said recess and upon the holding plate 12. With the nut loosely arranged upon the bolt, the spot of Figs. 2 and 3 can be easily seated in the recess 10 and opening 11 in an alley bed, after which the bolt can be turned with the aid of a screw driver to tighten the nut thereon. This pulls the nut up in the tapered opening 16 and the nut acts as a wedge spreading the lower portion of the shank, and tightly engaging it with the wall of the opening 11. The nut will be prevented from turning with the bolt by frictional engagement with the shank.

This form of spot can be used in any alley bed provided with a recess and an opening to receive it, and it is particularly useful for application to alley beds which have been bored to receive the setting pins of what is known commercially as a Simplex pin setter when it is desired to dispense with this form of pin setter and equip the alley bed with solid spots.

In Figs. 4 and 5 I have shown a type of spot for use in an alley bed, which is equipped with the simplex pin spotter and which requires an opening therethrough to accommodate the setter pins. This spot also has a circular disk head 20 and a cylindrical shank 21 having a central bore 22 which registers with a bore 23 in the head. A holding plate 24 is embedded in the head, and it is provided centrally with an opening which registers with the bores 22, 23 and is surrounded by a collar 25 which is embedded in the wall of the bore 22 in the shank. I prefer to make this bore 22 tapered to facilitate the entrance of the setter pin. The spot is held in place in the alley bed with the head seated in the recess 26 and the shank seated in the opening 27, by means of screws 28 which are arranged in openings 29 in the head and pass through the plate and into the alley bed.

I prefer to make the pin spot out of rubber which is not hard and is not soft, but is approximately midway between hard and soft, and similar to the soft tough stock of which rubber tires are made. The stock must be sufficiently hard to resist wear and to hold the pins upright, but at the same time I wish to make it sufficiently soft to reduce and practically eliminate the noise incident to spotting the pins, and also to prevent wear on the base of the pins.

I have found in practice that rubber pin spots in accordance with my invention are advantageous in many respects, and serve their purpose with entire satisfaction. They are easily inserted and can easily be removed for replacement. Under ordinary conditions a rubber spot will last for a long time, and it will save the pin from a great deal of wear on its base, where pins wear rapidly under most favorable conditions.

I am aware that changes in the form, construction and arrangement of parts of my invention may be made without departing from the spirit or sacrificing the advantages thereof, and therefore I reserve the right to make all such changes which come within the scope of the following claims:

I claim:

1. A bowling alley pin spot having a head and a shank adapted to fit in a recess and an opening in a bowling alley bed.

2. A bowling alley pin spot made of comparatively soft tough rubber stock and having a head and a shank adapted to fit in a recess and an opening in a bowling alley bed.

3. A bowling alley pin spot made of comparatively soft tough rubber stock and having a head and a shank with an opening therethrough and adapted to fit in a recess and an opening in a bowling alley bed.

4. A bowling alley pin spot comprising a head and a shank having an opening therethrough, and a plate embedded in the head and having an opening registering with the opening in the head and shank.

5. A bowling alley pin spot comprising a head and a shank having an opening in the shank and adapted to fit in a recess and an opening in an alley bed, and means for expanding the shank to secure the spot in the alley bed by frictional contact.

6. A bowling alley pin spot comprising a head and a shank having an opening therethrough, part of the opening in the shank being tapered, a bolt arranged in the opening in the head and shank, and a tapered nut arranged on the bolt within the tapered opening in the shank.

7. A bowling alley pin spot comprising a head and a shank having an opening therethrough, part of the opening in the shank being tapered, and part of the opening in the head being in the form of a recess, a bolt arranged in said opening with its head in the recess in the head of the pin spot, and a tapered nut arranged on the bolt in the tapered opening in the shank.

8. The combination of a pin spot having a head and a shank, and a bowling alley bed having a recess to receive the head and an opening to receive the shank, and means for securing the pin spot in the alley bed.

9. The combination of a pin spot having a head and a shank and an opening therethrough, a bowling alley bed having a recess to receive the head and an opening to receive the shank, and means for securing the spot in the alley bed.

10. The combination of a pin spot having a head and a shank, a bowling alley bed having a recess to receive the head and an opening to receive the shank, a holding plate embedded in the head, and means engaging said holding plate for securing the spot in the alley bed.

11. The combination of a pin spot having a head and a shank with an opening therethrough, a bowling alley bed having a recess to receive the head and an opening to receive the shank, and means within said pin spot for expanding a part thereof to secure the spot in the alley bed.

12. The combination of a pin spot comprising a head and a shank having an opening therethrough, an alley bed having a recess to receive the head and an opening to receive the shank, a holding plate embedded in the head of the spot, a bolt engaged with said plate and arranged in the opening in the spot, and a tapered nut on the bolt engaging the wall of the opening in the shank to expand the shank in the opening of the alley bed.

13. The combination of a rubber pin spot having a head and a shank with an opening therethrough, the upper end of said opening being in the form of a recess in the head and the lower end of said opening being tapered in the shank, an alley bed having a recess to receive the head and an opening to receive the shank, a holding plate embedded in the head, a bolt arranged in said opening in the spot with its head in the recess in the head and engaging said holding plate, and a tapered nut arranged on the bolt in the tapered recess in the shank to expand the shank in the opening of the alley bed.

JOSEPH W. BISHOP.